June 30, 1925.  1,544,002
F. H. GROVE
STEAM JACKETED MOLD
Filed Jan. 20, 1923   2 Sheets-Sheet 1
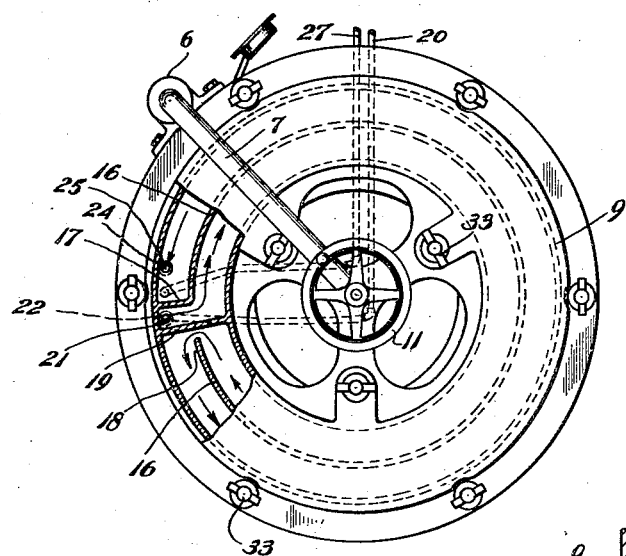
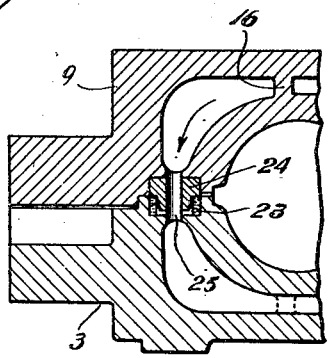
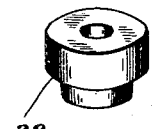
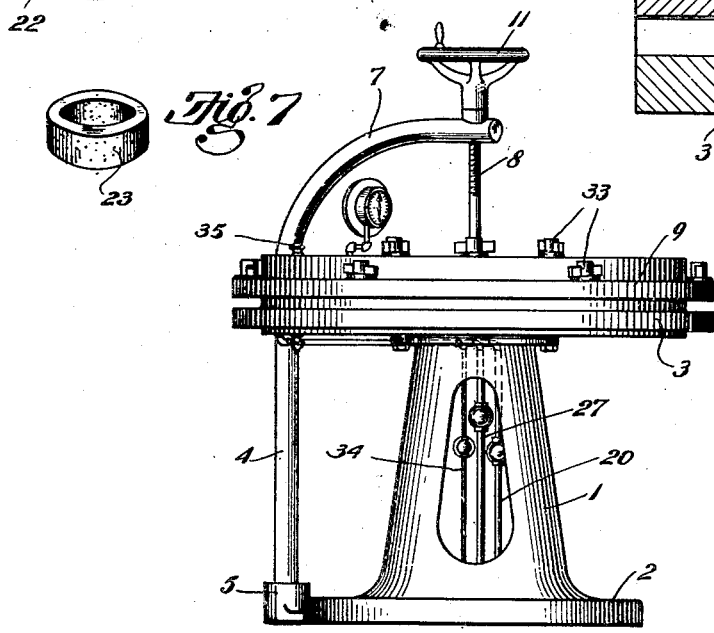
Inventor
F. H. Grove
By Frease and Bond
Attorneys June 30, 1925.
F. H. GROVE
1,544,002
STEAM JACKETED MOLD
Filed Jan. 20, 1923
2 Sheets-Sheet 2
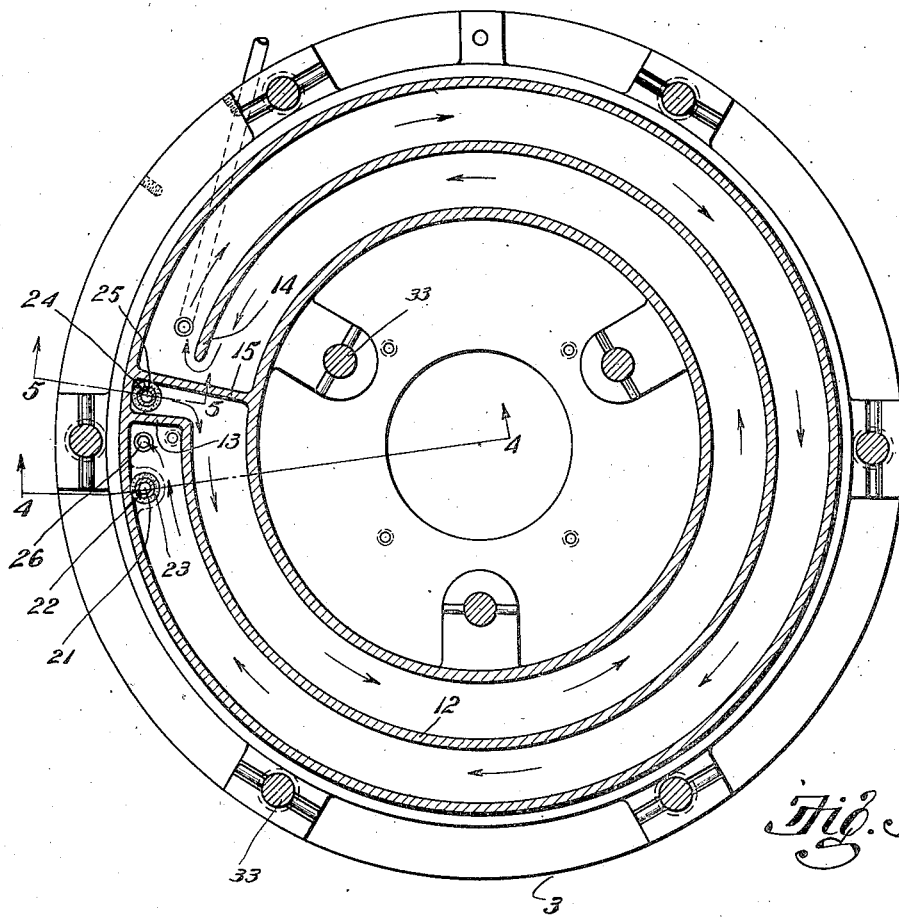
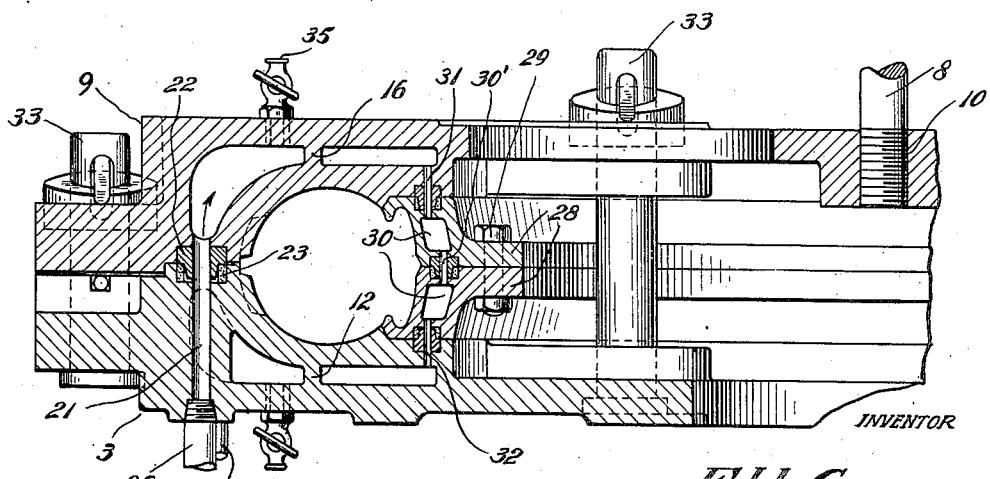
INVENTOR
F. H. Grove
By Freast and Bond
Attorneys Patented June 30, 1925.

1,544,002

UNITED STATES PATENT OFFICE.

FRANK H. GROVE, OF COLUMBIANA, OHIO.

STEAM-JACKETED MOLD.

Application filed January 20, 1923. Serial No. 613,886.

*To all whom it may concern:*

Be it known that I, FRANK H. GROVE, a citizen of the United States, residing at Columbiana, in the county of Columbiana and State of Ohio, have invented a new and useful Steam-Jacketed Mold, of which the following is a specification.

This invention relates to tire molds and more particularly to a steam jacketed mold for vulcanizing tires, and has for its objects to provide a mold comprising a stationary part and a removable part, a steam inlet and outlet being connected to the stationary part of the mold, nipples being formed in one of the parts and arranged to extend into the other part, whereby the steam entering the mold is circulated around through each part of the mold upon all sides of the tire being formed therein; to provide a removable bead ring having steam compartments communicating with the other parts of the mold; and to provide means for quickly and easily clamping the mold parts together.

The above and other objects may be attained by constructing the mold in the manner illustrated in the accompanying drawings, in which—

Figure 1 is a side elevation of a mold embodying the invention, showing the same in operative position;

Fig. 2, a plan view of the same with parts of the upper mold section broken away;

Fig. 3, a horizontal section through the lower mold section;

Fig. 4, a section on the line 4—4, Fig. 3;

Fig. 5, a section on the line 5—5, Fig. 3;

Fig. 6, a detached perspective view of one of the nipples carried in the upper mold section; and Fig. 7, a similar view of one of the rubber gaskets in the lower mold section.

Similar numerals of reference indicate corresponding parts throughout the drawings.

The mold is mounted upon a hollow pedestal 1 supported upon a base 2, the stationary mold section 3 being fixed to the base in any suitable manner. A rod 4 is journaled at its lower end in a bearing 5 upon the base and through a bearing 6 upon the lower stationary mold section 3, the upper end of the rod being curved as at 7, a vertical screw 8 extending through the end portion thereof and being connected to the central portion of the upper mold section 9 as shown at 10, a hand wheel 11 being fixed upon the upper end of the screw, above the curved arm 7 for the purpose of raising or lowering the removable mold section 9.

It will be seen that when the mold sections are disconnected, and the screw operated to raise the upper section clear of the lower fixed section, the rod 4 may be rotated, swinging the curved arm 7 outward and moving the upper mold section entirely away from the lower mold section.

The lower stationary mold section 3 is provided with a hollow interior divided by means of the concentric partition wall 12 which is provided at one end with an outturned portion 13 extending to the outer wall, the other end of said partition wall terminating as at 14, spaced from the radial partition wall 15 which extends from the inner wall of the lower mold section to the outer wall thereof.

The upper mold section 9 is provided with a similar concentric partition wall 16 having the out-turned portion 17 connected to the outer wall and terminating at its other end as at 18 spaced from the radial partition wall 19.

A steam supply pipe 20 extends up through the hollow pedestal 1 and is connected with the vertical passage 21 in the lower mold section 3, said passage being arranged to register with the nipple 22, which communicates with the interior of the upper mold section 9 between the radial walls 17 and 19, as best shown in Fig. 2.

A rubber gasket 23 surrounds the upper end of the passage 21 and is arranged to receive the tapered end of the nipple 22 to form a steam tight joint. Steam will thus enter the upper or removable mold as through the nipple 22 and pass around the interior of the same in the direction of the arrows shown in Fig. 2, passing first around the inside of the partition wall 16 to the open extremity thereof and then back around the outside of said partition wall and downward through the nipple 24 which is of the same construction as the nipple 22 and which connects with the passage 25, connecting with the interior of the lower mold section 3, said passage being provided with a rubber gasket 23 to form a steam tight joint around the nipple 24.

The steam passing downward from the upper mold section thus enters the lower mold section between the radial walls 13 and 15 and passes in the direction of the arrows shown in Fig. 3 entirely around the inside of the partition wall 12 to the open end thereof and then circulates back around the outside of said partition wall to the outlet 26 which is connected to the steam return pipe 27.

A bead ring, preferably formed of two sections 28, arranged to be clamped together as by the bolts 29, is adapted to be clamped over the beads of the tire carcass and placed between the upper and lower mold sections, as best shown in Fig. 4.

If desired, these sections of the bead ring may be provided with circular steam chambers 30 connected together as by the passage 30' and connected to the upper and lower mold sections as by the passages 31 and 32 respectively, nipples and washers similar to those above described being provided in each of these passages.

It will thus be seen that the steam will first enter the upper or removable mold section and circulate entirely around the same upon the inner and outer sides of the concentric partition wall therein and then pass downward and circulate in the same manner around the lower or fixed mold section, after which it passes back through the return pipe to the boiler.

At the same time, a part of the steam will also pass downward from the upper mold section and be circulated around the chambers of the bead ring, passing from the same to the lower mold section and returning to the boiler.

In vulcanizing a tire in the mold, assuming that a cord tire is being formed, the tire upon the air bag is clamped between the bead rings 28 and placed in position upon the lower mold section, the upper mold section being at this time swung outward upon the curved arm 7.

The arm 7 is then swung into position to place the upper mold section concentrically above the lower mold section and the screw 8 operated by the hand wheel 11 to lower the upper mold section into engagement with the lower section.

The clamping devices 33 are then tightened, clamping the tire tightly between the upper and lower mold sections and clamping the sections together, forming steam tight joints at the passages where the steam circulates from one section to the other. The steam is then turned on and circulates through the mold sections in the manner above described, the tire being left in the mold until properly cured.

In the event a fabric tire is to be vulcanized, the tire upon the core is placed between the mold sections in the manner above described, the bead ring 28 in this instance not being used. The rest of the operation, however, is the same for the fabric tire as above described for vulcanizing the cord tire.

For the purpose of inflating the air bag, either continuously or at the beginning of the cure, an air line 34 is provided. An air cock 35 is provided on top of the mold to let the air out of the mold, as the air and steam will not mix and if the air is left in the mold, it will prevent proper vulcanizing of the tire.

I claim:—

1. A tire mold including a fixed section and a movable section, each section having a steam compartment therein, steam supply and return pipes connected to the fixed section and a passage connecting the interiors of the two sections and means for circulating steam entirely around each compartment and back to a point near the steam inlet.

2. A tire mold including a fixed section and a movable section, each section having a steam compartment therein, a steam supply pipe extending through the fixed section and arranged to communicate with the movable section, a detachable connection between the steam compartments of the two sections and a steam return pipe connected to the fixed section and means for circulating steam entirely around each compartment and back to a point near the steam inlet.

3. A tire mold including a fixed section and a movable section, each section having a steam compartment therein, steam supply and return pipes connected to the fixed section, a detachable connection between the compartments of the two sections means for circulating steam entirely around each compartment and back to a point near the steam inlet, and means for swinging the movable section away from the fixed section.

4. A tire mold including a hollow mold section having an annular steam compartment having steam inlet and outlet ports located adjacent to each other and means for circulating steam entirely around said compartment from the inlet port and back around the compartment to the outlet port.

5. A tire mold including a hollow mold section having an annular steam compartment, a radial wall through said compartment and a concentric wall extending from the radial wall around the compartment to a point spaced from the radial wall in order that steam may be circulated around the compartment on one side of the concentric wall and back upon the other side thereof.

In testimony that I claim the above, I have hereunto subscribed may name.

FRANK H. GROVE.